United States Patent [19]
Wilson et al.

[11] Patent Number: 5,147,747
[45] Date of Patent: Sep. 15, 1992

[54] LOW FUSING TEMPERATURE TONE POWDER OF CROSSLINKED CRYSTALLINE AND AMORPHOUS POLYESTERS

[75] Inventors: John C. Wilson; Lawrence P. DeMejo, both of Rochester, N.Y.

[73] Assignee: Eastman Kodak Company, Rochester, N.Y.

[21] Appl. No.: 563,010

[22] Filed: Aug. 6, 1990

[51] Int. Cl.$^5$ .............................................. G03G 9/00
[52] U.S. Cl. .................................... 430/109; 430/110; 430/904
[58] Field of Search ......................... 430/109, 110, 904

[56] References Cited

U.S. PATENT DOCUMENTS

| | | |
|---|---|---|
| 3,853,778 | 12/1974 | Buckley et al. |
| 4,385,107 | 5/1983 | Tanaka et al. |
| 4,528,257 | 7/1985 | Polderman et al. |
| 4,931,375 | 6/1990 | Akimoto et al. ..................... 430/109 |
| 4,940,644 | 7/1990 | Matsubara et al. .................. 430/109 |
| 4,973,539 | 11/1990 | Sacripante et al. ................. 430/109 |
| 5,057,392 | 10/1991 | McCabe et al. ...................... 430/109 |

FOREIGN PATENT DOCUMENTS 65146 3/1981 Japan.

*Primary Examiner*—Marion E. McCamish
*Assistant Examiner*—S. C. Crossan
*Attorney, Agent, or Firm*—Dressler, Goldsmith, Shore, Sutker & Milnamow, Ltd.

[57] ABSTRACT

A low fusing temperature toner powder with good keep and broad fusing latitude characteristics is provided. The toner powder is comprised of polymer particles of a partially carboxylated crystalline polyester and partially carboxylated amorphous polyester that has been crosslinked together at elevated temperature with the aid of an epoxy novolac resin and a crosslinking catalyst.

8 Claims, No Drawings

LOW FUSING TEMPERATURE TONE POWDER OF CROSSLINKED CRYSTALLINE AND AMORPHOUS POLYESTERS

FIELD OF THE INVENTION

This invention is in the field of low fusing temperature toner powders of partially carboxylated, crosslinked crystalline and amorphous polyesters.

BACKGROUND OF THE INVENTION

In the electrophotography art, there is a need for relatively low fusing temperature toner powders. These toners not only reduce power consumption and copier warm up time, but also increase the useful life of machine components in copiers because of inherent reduced heat spillage from the fuser subsystem. These toners also permit higher speed fusing and reduce problems with paper receivers.

To achieve such results, various approaches have been tried. One approach has been to use linear amorphous polymers with a reduced $T_g$. However, these polymers result in poor toner keeping characteristics and very little fusing latitude. They also require the use of excessive wicking fluid quantities.

Another approach has been to use crosslinked amorphous polyester toners that utilize a low molecular weight polymer that is crosslinked to achieve fusing latitude as taught in U.S. Pat. No. 3,938,992 and U.S. Reissue Pat. No. 31,072. However, the onset of fusing temperature of these toners is limited by the toner $T_g$.

Another approach has been to use polyblends such as a blend of an amorphous polyester polymer with a crystalline polyester polymer (as taught in Japanese Laid-Open patent application Kokai No. 65146/1981). However, toners of these blends display poor keeping properties that are evidently caused by the polymers being compatible and behaving as though they constituted a single amorphous polymer with a low $T_g$.

So far as now known, the prior art approaches have not solved the problem of achieving a low fusing temperature toner powder with good keep and grindability characteristics.

SUMMARY OF THE INVENTION

This invention relates to low fusing temperature toner powders for electrophotographic usage, to polymers useful in the toner powders, and to processes for making the polymers.

The present invention employs the reaction product of a crystalline and an amorphous polyester polymer. The crystalline polymer has a relatively low $T_g$, a relatively low $T_m$ and functional pendant and/or terminal groups that are a mixture of hydroxyl groups and carboxyl groups. The amorphous polymer has a higher $T_g$ than the crystalline polymer. Its functional pendant and/or terminal groups are a mixture of hydroxyl groups and carboxyl groups. Included in the reaction mixture is a low molecular weight epoxy novolac resin and a crosslinking catalyst.

When the mixture of polymers is melt blended, crosslinking occurs to produce a crystalline/amorphous block polyester copolymer. Such a crosslinked polymer displays excellent grindability characteristics.

Toner powders made from such a crosslinked polymer display good keep and low temperature fusing characteristics coupled with a broad fusing latitude.

Various other features, advantages, aims, purposes, embodiments, and the like of this invention will be apparent to those skilled in the art from the present specification and appended claims.

DETAILED DESCRIPTION OF THE INVENTION

(a) Definitions

The term "particle size", as used herein, or the term "size", or "sized" as employed herein in reference to the term "particles", means volume weighted diameter as measured by conventional diameter measuring devices, such as a Coulter Multisizer, sold by Coulter, Inc. Mean volume weighted diameter is the sum of the mass of each particle times the diameter of a spherical particle of equal mass and density, divided by total particle mass.

The term "glass transition temperature" or "$T_g$" as used herein means the temperature at which a polymer changes from a glassy state to a rubbery state. This temperature ($T_g$) can be measured by differential thermal analysis as disclosed in "Techniques and Methods of Polymer Evaluation", Vol. 1, Marcel Dekker, Inc., N.Y. 1966.

The term "melting temperature" or "$T_m$" as used herein means the temperature at which a polymer changes from a crystalline state to an amorphous state. This temperature ($T_m$) can be measured by differential thermal analysis as disclosed in "Techniques and Methods of Polymer Evaluation."

The term "onset of fusing temperature" as used herein in relation to a toner powder means the lowest temperature at which a high density solid area patch developed with this toner, after being run through a fuser nip, folded upward with loose toner brushed off the fold, exhibits $<100\mu$ crack width (i.e., good adhesion to paper) measured on a Canon PC type fusing breadboard consisting of an unoiled hard Teflon fusing roll engaged onto a compliant rubber backup roll at a constant speed and pressure.

The term "fusing latitude" as used herein means the fusing range at constant speed and pressure from the onset of fusing temperature to the hot offset temperature (i.e., lowest temperature at which some of the fused image "offsets" onto the fusing roll surface as observed by running a blank chase sheet through the fuser immediately after the toned image). The hot offset condition occurs when the interfacial bond strength of the molten toner to the fusing roll exceeds the hot melt cohesive strength of the toner.

The term "low molecular weight" as used herein means a number average molecular weight under about 2,500.

The term "crystalline" as used herein in relation to a polymer means that the polymer is one that is semi-crystalline and shows at least one definite crystalline melting point as well as a small low-temperature glass transition point.

The term "amorphous" as used herein in relation to a polymer means that the polymer shows only a well-defined glass transition point.

The term "reactable carboxyl groups per molecule" as used herein in relation to a polymer means that the polymer contains pendant and/or terminal carboxyl groups that are reactable with a low molecular weight epoxy novolac resin.

The term "reactable hydroxyl groups per molecule" as used herein in relation to a polymer means that each molecule of polymer contains pendant and/or terminal hydroxyl groups that are reactable with an acidic moiety, such as pyromellitic dianhydride.

The term "keep" or "keeping" as used herein in relation to a toner powder means the storage stability of the toner powder (i.e., its ability to retain its original particle size distribution when stored in a cartridge at a specified range of temperature and RH conditions. An accelerated keep best measures the ability of the toner to retain its fine powder flow characteristics. A small amount of toner is added to a cylindrical glass vial. A cylindrical weight is placed over the packed toner layer (to simulate the toner at the bottom of a cartridge) and the vial is placed in an oven for a set period of time at a set temperature. Toner keep is controlled by the glass transition temperature or softening point of the toner. The keep is subjectively evaluated by removing the toner from the vial after the incubation period and determining its powder characteristics by applying some pressure to the packed powder. If it retains its original powder form without applying any pressure or with slight pressure it rates good to excellent. A fair keep indicates that some pressure is required to break up the clump. Poor and fused keep ratings indicate partial or total sintering of the packed powder.

(b) Preparation Process and Starting Materials

In preparing the polymers of this invention, one mechanically mixes together a carboxylated crystalline polyester, a carboxylated amorphous polyester polymer, a low molecular weight epoxy novolac resin and a crosslinking catalyst.

The crystalline polyester has a glass transition temperature in the range of about $-20°$ to about $60°$ C. and a melting temperature in the range of about $60°$ to about $120°$ C. The crystalline polyester has a number average molecular weight in the range of about 1,500 to about 5,000 and a weight average molecular weight in the range of about 3,000 to about 10,000. The polymer contains about 2 reactable carboxyl groups per molecule.

As those skilled in the art will appreciate, the crystalline polyester polymer can have many structures depending upon such variables as the monomers (including branching agents) used for polycondensation and the condensation conditions employed.

One presently preferred class of carboxylated crystalline polyesters is initially formed with terminal hydroxyl groups. Preferably the number of reactable hydroxyl groups per molecule is 2. About 40 to about 60 percent of the hydroxyl groups are reacted with a polycarboxylic acid anhydride.

Suitable acid anhydrides are preferably aromatic and contain at least two carboxyl groups per molecule when in the hydrated (or acid) form. Examples of suitable anhydrides include pyromellitic dianhydride, trimellitic anhydride, phthalic anhydride, 3,3',4,4'-benzophenonetetracarboxylic dianhydride, glutaric anhydride, succinic anhydride, maleic anhydride, and the like. A presently preferred aromatic anhydride is pyromellitic dianhydride. It is presently preferred to react about 50 percent of the hydroxyl groups with pyromellitic dianhydride. The carboxylation reaction converts the reactive hydroxyl groups into reactable carboxyl groups.

One exemplary and presently preferred class of crystalline polyesters is linear and is a condensate of:

(a) about 50/50 to about 100/0 mole ratio of 1,6-hexanediol;
(b) about 0/100 to about 50/50 mole ratio of other glycols;
(c) about 100/0 to about 50/50 mole ratio of dimethyl terephthalate; and
(d) about 0/100 to about 50/50 mole ratio of additional diesters Useful diols include neopentyl glycol, 1,4-cyclohexanedimethanol, ethylene glycol, 1,4-butanediol, etc. Any glycol which in proper combination with other monomers will provide a crystalline polyester with the specified $T_m$ and $T_g$ can be used. Combinations of one or more glycols can also be used. Useful diesters include dimethyl isophthalate, dimethyl phthalate, dimethyl 2,6-naphthalenedicarboxylate, dimethyl adipate, etc. One can use any combination of diesters which with the appropriate glycols will give a crystalline polyester with the specified $T_g$ and $T_m$. The condensate is partially esterified by a carboxylation reaction using about 40 to about 60 percent of hydroxyl groups with an anhydride, such as pyromellitic dianhydride.

One presently preferred embodiment within the class of substantially crystalline polyesters is a condensate of 1,6-hexanediol, neopentyl glycol, and dimethyl terephthalate which has been reacted with pyromellitic dianhydride to produce a polymer having the general structure:

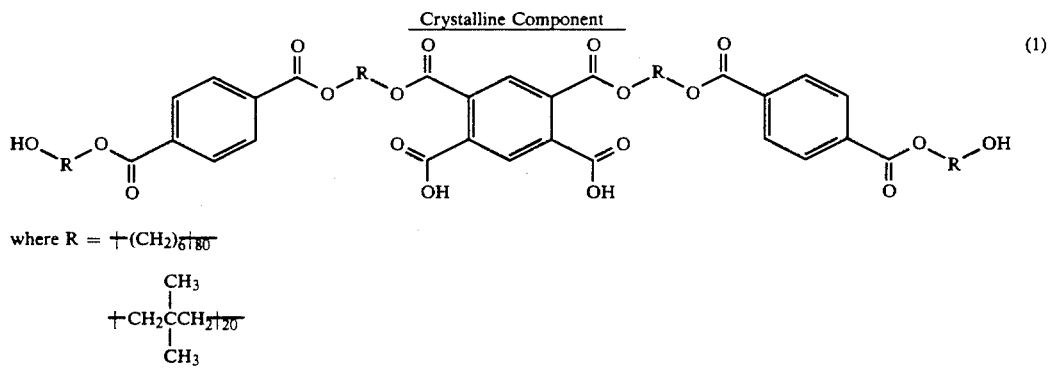

where R = $+(CH_2)_{6\overline{180}}$ $$\begin{array}{c} CH_3 \\ | \\ +CH_2CCH_2+_{\overline{20}} \\ | \\ CH_3 \end{array}$$

In this polymer, about 50% of the initial terminal hydroxyl groups are converted to carboxyl groups through esterification with pyromellitic dianhydride. This is achieved by reacting about 0.5 mole of pyromellitic dianhydride with each mole of polyester. The resulting polymer has a $T_g$ of about $20°$ C., a $T_m$ of about 120° C., and contains about 2 carboxyl groups per molecule and about an equal number of hydroxyl groups per molecule.

dianhydride to produce a polymer having the structure:

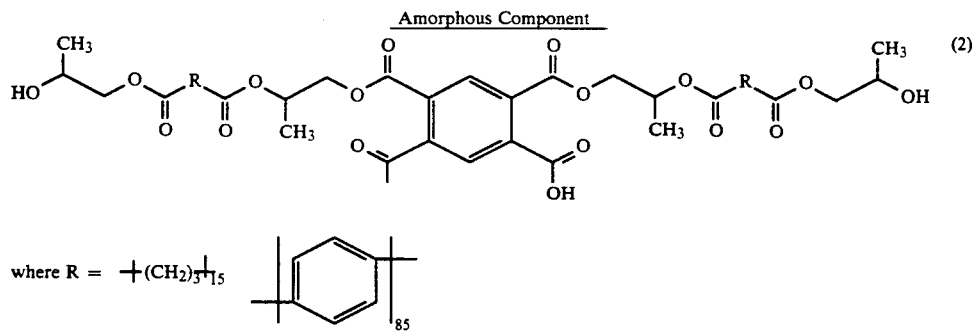

A preferred amorphous polyester has a glass transition temperature in the range of about 50° to about 90° C. The polyester has a number average molecular weight in the range of about 1,500 to about 5,000 and a weight average molecular weight in the range of about 3,000 to about 10,000. The polyester contains about 2 reactable carboxyl groups per molecule.

As those skilled in the art will appreciate, such an amorphous polyester polymer can have any one of many structures depending upon such variables as the monomers (including branching agents) used for polycondensation and the condensation conditions.

One presently preferred class of amorphous polyesters is initially formed with terminal hydroxyl groups. Preferably the number of reactable hydroxyl groups per molecule is about 2. In such an amorphous polyester, preferably about 40 to about 60 percent of the hydroxyl groups are reacted with a polycarboxylic acid anhydride. A presently particularly preferred anhydride is pyromellitic dianhydride. It is preferred to react about 50 percent of the hydroxyl groups with pyromellitic dianhydride. The carboxylation reaction converts about half of the hydroxyl groups into carboxyl groups.

One presently preferred class of amorphous polyesters is linear and is a condensate of:

(a) about 100/0 to about 10/90 mole ratio of 1,2-propanediol;
(b) about 0/100 to about 90/10 mole ratio of additional glycols;
(c) about 95/5 to about 75/25 mole ratio of dimethyl terephthalate; and
(d) about 5/95 to about 25/75 mole ratio of dimethylglutarate or other suitable diesters.

Other useful diols include neopentyl glycol, 1,4-cyclohexanedimethanol, ethylene glycol, etc. (or most any glycol which in proper combination with other monomers will provide an amorphous polyester with the specified $T_g$). One may also use a combination of one or more glycols. Other useful diesters include dimethyl isophthalate, dimethyl phthalate, dimethyl 2,6-naphthalenedicarboxylate, dimethyl adipate, etc. (any combination of diesters which with the appropriate glycols will give an amorphous polyester with the specified $T_g$). The condensate can be partially esterified by reacting about 40 to about 60 percent of such hydroxyl groups with an anhydride, such as pyromellitic dianhydride.

One presently preferred embodiment within the class of amorphous polyesters is a condensate of 1,2-propanediol, dimethyl glutarate, and dimethyl terephthalate which has been reacted with pyromellitic In this polymer, about 50% of the initial terminal hydroxyl groups are converted to carboxyl groups through esterification with pyromellitic dianhydride which is achieved by reacting about 0.5 moles of pyromellitic dianhydride with each mole of polyester condensate. The resulting polymer has a $T_g$ of about 53° C., and contains about 2 carboxyl groups per molecule and about an equal number of hydroxyl groups per molecule.

Methods for making the crystalline and amorphous polyesters are known to the art and are illustrated in the Examples below. The reaction of each type of polyester with a carboxylic acid anhydride is conveniently carried out under elevated temperature. Temperatures in the range of about 200° to about 280° C. are typical and presently preferred.

The low molecular weight epoxy novolac resin has about 2 to about 6 epoxide groups per molecule.

The term "epoxy novolac resin" as used herein means an epoxy resin made by the reaction of epichlorohydrin with a novolac resin. An epoxy novolac resin contains the repeating pendant epoxide structure:

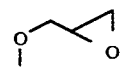

A novolac resin is a condensate of a phenol compound with formaldehyde in the presence of acid catalysts. The phenol compound can be phenol itself or such compounds as the cresols, xylenols, resorcinol, naphthols, mixtures thereof, and the like. Epoxy novolac resins used in the practice of this invention have epoxy functionalities which are typically in the range of about 2 to about 6.

One presently preferred class of epoxy novolac resins comprises epoxy cresol novolac resins having a molecular weight in the range of about 500 to about 1,300. Such a polymer is a novolac resin wherein cresol and formaldehyde are condensed and then reacted with epichlorohydrin to produce a polymer having an epoxy functionality in the range of about 2 to about 6.

An example of a presently preferred epoxy cresol novolac is derived from o-cresol, formaldehyde, and epichlorohydrin and is characterized by the structure:

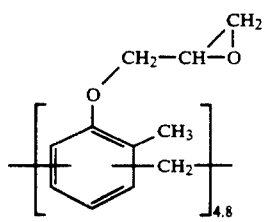 (3)

Such an epoxy resin is obtainable from Ciba-Geigy Corp. under the trade designation "ECN 1273" and has an epoxy functionality of about 4.8.

The crosslinking catalyst promotes the reaction between carboxylated polyesters and polyepoxides. Examples of such catalysts include tertiary amines, such as N,N-dimethylbenzylamine, and the like; quaternary ammonium salts, such as N-benzyl-N,N-dimethyl-octadecylammonium chloride, and the like; quaternary phosphonium salts, such as an alkyl triphenylphosphonium tosylate, and the like; triphenylphosphines; and imidazolines, such as 2-phenylimidazoline, and the like. Presently preferred cross-linking catalysts are also charge control agents. A presently preferred crosslinking catalyst and charge control agent is an alkyltriphenylphosphonium tosylate wherein the alkyl group is methyl.

A charge control agent which does not exhibit any particular capacity as a crosslinking catalyst may also be used. Suitable charge control agents for use in the practice of this invention are disclosed, for example, in U.S. Pat. Nos. 3,893,935; 4,079,014; and 4,323,634; and British Patent Nos. 1,501,065 and 1,420,839. These charge control agents are generally employed in small quantities, such as about 0.1 to about 3 weight percent on a total toner powder weight basis, and preferably about 0.2 to about 1.5 weight percent (same basis).

Suitable dyes and pigments are disclosed, for example, in U.S. Reissue Pat. No. 31,072 can also be used. One particularly useful colorant for toners to be used in black-and-white electrophotographic copying machines is carbon black. When employed, colorants are generally employed in quantities in the range of about 1 to about 30 weight percent on a total toner powder weight basis, and preferably about 1 to about 8 weight percent (same basis).

The toner formation comprises:
  about 25 to about 75 weight percent of a low molecular weight carboxylated crystalline polyester;
  about 25 to about 75 weight percent of a low molecular weight carboxylated amorphous polyester;
  about 2.5 to about 10 weight percent of an epoxy novolac resin; and
  about 0.5 to about 4 weight percent of a cross-linking catalyst.

The formulation also contains up to about 3 weight percent of a charge control agent, and up to about 30 weight percent of a colorant.

Particularly when the presently preferred crystalline and amorphous carboxylated polyesters are employed, the preferred weight ratio of one to the other is about 1:1.

The starting materials are typically solids at ambient conditions. Preferably the particle size of the starting materials is less than about ⅛" diameter and more preferably is in the range of about 10 to about 500 microns.

The mixture is conveniently melt blended on heated rollers in a conventional roll mill or the like. An extruder also can be used for melt blending. Suitable melt blending temperatures are in the range of about 90° to about 180° C., and preferably in the range of about 120° to about 160° C. Two roll mill melt blending times are in the range of about 10 to about 60 minutes, preferably about 20 to about 40 minutes. Extrusion melt blending times are in the range of 0.5 minutes to 10 minutes.

During melt blending, a crosslinking reaction occurs that involves a reaction of each of the carboxylated polyesters with the polyepoxide. Addition esterification is believed to be the major reaction taking place. The resulting crosslinked polymer has a substantially increased offset latitude compared to either starting polyester polymer or to an uncrosslinked mixture of such polymers.

After melt blending, the polymer or toner is cooled. Grinding of an extruded polymer or toner of this invention can be carried out by any convenient procedure. For example, the solid polymer can be crushed and ground to a desired particle size using, for instance, a fluid energy or a jet mill, such as is described in U.S. Pat. No. 4,089,472. One or more conventional particle classification steps can be used to achieve a toner particle composition having a desired particle size and size distribution.

(c) Product Characteristics

Toner particles of the present invention can have a particle size in the range of about 5 to about 50 microns, preferably in the range of about 2 to about 30 microns.

Toner particles of the present invention also have a fusing latitude in the range of about 225° to about 375° F., although toners with higher and lower fusing temperatures can be used.

The polymers of the present invention are only partially crosslinked. By controlling the level of crosslinking different combinations of fusing temperatures and offset latitude can be achieved.

Toners display good keeping qualities.

This invention is illustrated by the following examples:

EXAMPLE 1

Crystalline Low Molecular Weight Polyester

Into an open 1 liter polymer flask was placed a mixture of 388.4 g (2.0 mol) of dimethyl terephthalate; 189.1 g (1.6 mol) of 1,6-hexanediol and 48.55 g (0.466 mol) of neopentyl glycol which was heated at 200° C. under $N_2$. When a molten state was reached, 20 drops of Ti-(OiPr)$_4$ were added. Thereafter, the reaction mass was maintained at 200° C. for 2 hours and then at 225° C. for 2 hours with continuous stirring. Then the open reactor was placed in a vacuum chamber maintained at 2.5mm Hg for a total of about 18 minutes after which the reaction mass was allowed to cool under ambient conditions.

Analysis:

—OH content=0.215 meq/gm.

Inherent Viscosity (dichloromethane)=0.19. The reaction equation was as follows:

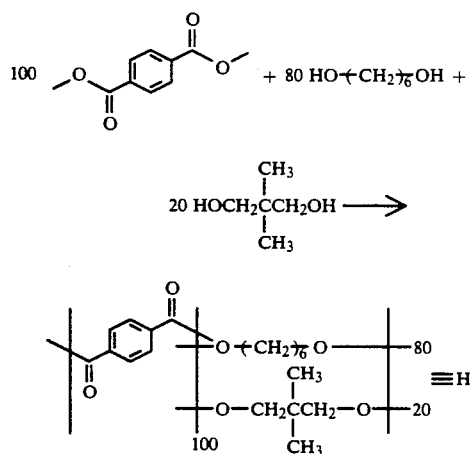

Based on the above —OH content, the polymer was carboxylated by preparing a mixture 455.7 gm (97.98 meq.) of polyester and 5.343 gm (48.99 meq.) of pyromellitic dianhydride. This mixture was heated at 250° C. under $N_2$ for 15 minutes until molten, then stirred for 1 hour longer at the same temperature, and finally cooled.

Analysis:

found $CO_2H$ content = 0.096 meq/gm.
calculated $CO_2H$ content = 0.106 meq/gm.
$T_g = 14.3°$ C.
$T_m = 115°$ C.
Inherent Viscosity (dichloromethane) = 0.20.
The reaction equation was as follows:

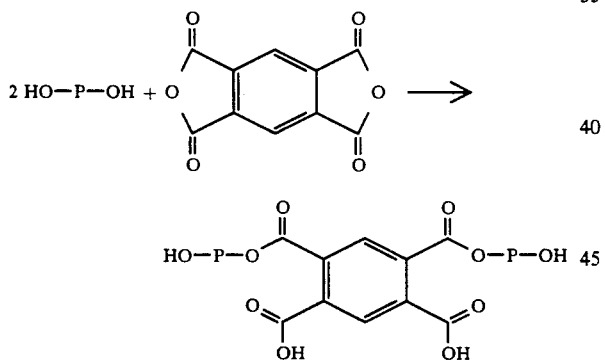

EXAMPLE 2

Amorphous Low Molecular Weight Polyester

A mixture of 330.12 g (1.7 mol) of dimethyl terephthalate, 48.05 g (0.3 mol) of dimethyl glutarate, and 213.08 g (2.8 mol) of 1,2-propanediol was heated in a 220° C. bath until molten with $N_2$ bubbling. Then 20 drops of $Ti(OPr)_4$ were added. About 2¼ hours later, the reaction temperature was raised to 240° C., and about 1 hour thereafter the reactor head was removed, and the reactor was placed under vacuum (about 0.20 mm Hg) about 1 hour after such head removal with stirring being continuous. About 1.5 hours later, the reaction mass was cooled.

Analysis:

—OH content = 0.38 meq/g.
Inherent Viscosity = 0.14.
$T_g = 57°$ C.

The reaction equation was as follows:

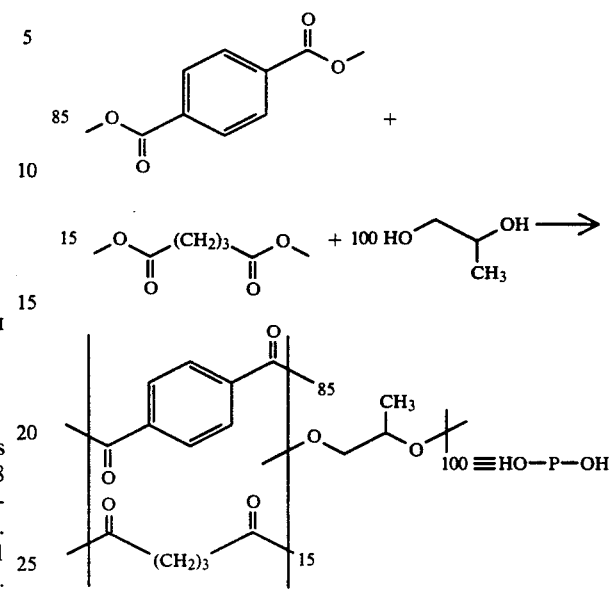

Based on the above -OH content, carboxylation was accomplished by preparing a mixture of 370.0 grams (0.1406 equivalents) of the product polymer with 7.67 (0.0703 equivalents) of pyromellitic dianhydride which was heated under $N_2$ in a 250° C. bath under $N_2$ until the resulting polymeric mass was stirrable (about 20 minutes). The mixture was then stirred for one hour and cooled.

Analysis:

Inherent Viscosity = 0.14 (in dichloromethane).
found —$CO_2H$ content = 0.217 meq.
calculated —$CO_2H$ content = 0.186 meq/gm.
The reaction equation was as follows:

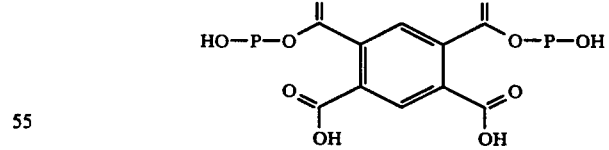

EXAMPLE 3

Polymer and Toner Powder Preparation

Each of the carboxylated polyesters prepared in the manner of Examples 1 and 2 was ground to a particle size of about 1/16". Then, each ground polyester was admixed with an epoxy novolac resin obtained from Ciba-Geigy Corporation under the trade designation "ECN 1273" which had an epoxy functionality of about 4.8 and which had a particle size of about 1/16" and also with methyltriphenylphosphonium tosylate which had a particle size of about 200μ. The uniform particulate premix had the following composition
(1) 50 g of 50% carboxylated polyester of Ex. 1
(2) 50 g of 50% carboxylated polyester of Ex. 2
(3) 6 g of ECN 1273
(4) 2.0 g of methyltriphenylphosphonium tosylate
(5) 6.4 g of "Regal TM 300" carbon black The "Regal TM 300" carbon black was obtained commercially from Cabot Corporation, and was added to the mixture after it had been compounded for 20 minutes on a compounding roller mill whose rollers had been preheated to 160° C. After addition of the carbon black compounding was continued for another 20 minutes before separation and cooling.

The resulting polymer contained on a 100 weight percent basis about 20 wt. % of an insoluble crosslinked reaction product comprised of components (1), (2) and (3) above, about 80 wt. % of a reaction product that was soluble in THF.

The cooled toner blend had excellent grindability characteristics.

The blend was ground into a toner powder wherein the average particle size was 12μ and the size distribution was 2–25μ. This toner powder had a fusion temperature of about 225° F., and a good keep after three days storage at 44° F.

The foregoing specification is intended as illustrative and is not to be taken as limited. Still other variations within the spirit and the scope of the invention are possible and will readily present themselves to those skilled in the art.

We claim:

1. A process for preparing a polymer for a low fusing temperature toner powder comprising the steps of:
    (a) admixing;
        (1) about 25 to about 75 weight percent of a low molecular weight, crystalline polyester that has been esterified with pyromellitic dianhydride and has the formula:

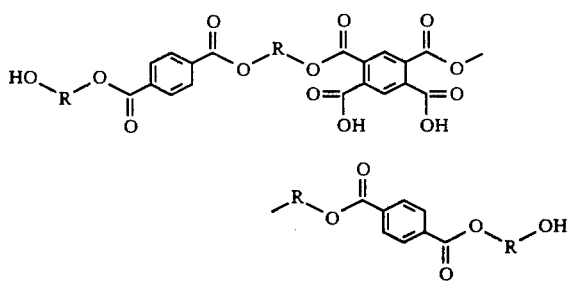

Where R =

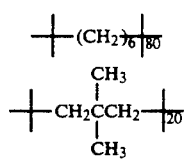

and has a glass transition temperature in the range of about −20° to about 60° C., a melting temperature in the range of about 60° to about 120° C., a number average molecular weight in the range of about 1,500 to about 5,000 and a weight average molecular weight in the range of about 3,000 to about 10,000, and containing about 2 carboxyl groups per molecule;

(2) about 25 to about 75 weight percent of a low molecular weight, amorphous polyester that has been esterified with pyromellitic dianhydride and has the formula:

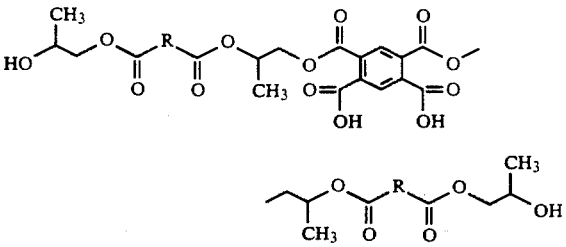

Where R =

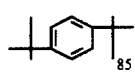

and has a glass transition temperature in the range of about 50° to about 90° C., a number average molecular weight in the range of about 1,500 to about 5,000 and a weight average molecular weight in the range of about 3,000 to about 10,000, and containing about 2 carboxyl groups per molecule;

(3) about 2 to about 10 weight percent of a low molecular weight epoxy novolac resin that has the formula:

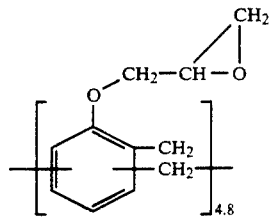

and has an epoxy functionality of about 4.8; and (4) about 0.5 to about 4 weight percent of a crosslinking catalyst; and (b) melt blending said mixture at a temperature in the range of about 90° to about 180° C.

2. The process of claim 1 wherein said mixture additionally includes about 0.5 to about 3 weight percent of a charge control agent.

3. The process of claim 2 wherein said crosslinking agent and said charge control agent is an alkyltriphenylphosphonium tosylate.

4. The process of claim 1 wherein said mixture additionally includes about 2 to about 15 weight percent of a colorant.

5. The process of claim 1 wherein the extruded product is ground into particles having a size in the range of about 2 to about 30 microns.

6. A toner powder produced by the process of claim 5 having a fusing temperature in the range of about 225° to about 375° F. and good keep and grindability characteristics.

7. A polymer produced by the process of claim 1.

8. A toner powder produced by grinding a polymixture of claim 7.

* * * * *

UNITED STATES PATENT AND TRADEMARK OFFICE
CERTIFICATE OF CORRECTION

PATENT NO. : 5,147,747
DATED : September 15, 1992
INVENTOR(S) : Wilson et al.

It is certified that error appears in the above-identified patent and that said Letters Patent is hereby corrected as shown below:

Column 9, Line 17    Remove the dash between $CH_2CCH_2$ and O.

Column 10, Line 39   After meq., insert --/gm.--.

Signed and Sealed this

First Day of March, 1994

BRUCE LEHMAN

Attest:

Attesting Officer

Commissioner of Patents and Trademarks